Figure 1:
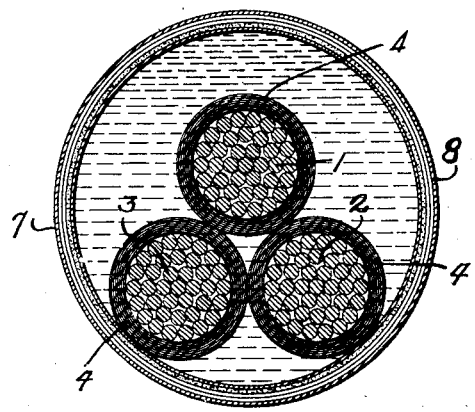

May 22, 1934.  G. N. EVEREST  1,959,354

ELECTRIC CABLE

Filed June 9, 1932

INVENTOR.
Guy N. Everest.
BY
Kiddle, Margeson and Harnidge.
ATTORNEYS.

Patented May 22, 1934

1,959,354

UNITED STATES PATENT OFFICE 1,959,354

ELECTRIC CABLE

Guy N. Everest, Ridgewood, N. J., assignor to The Okonite-Callender Cable Company, Incorporated, Paterson, N. J., a corporation of New Jersey Application June 9, 1932, Serial No. 616,194

4 Claims. (Cl. 247—3)

The present invention is directed to an improvement in cables, and has for one of its objects the provision of a cable construction capable of withstanding high internal pressures without injury to the metal casing enveloping the insulated conductor.

The present invention has for a further object the provision of a cable of the oil filled type in which I dispense entirely with the lead now employed as standard practice and employ a construction which will enable the cable to be maintained filled with oil at high pressures and permit of oil expansion in the cable due to temperature conditions without injury to the enveloping casing.

The present invention has for a further object the provision of a construction in which not only is the metal casing of the cable capable of successfully withstanding any internal pressures built up without permanent distortion and without bursting but the flexibility of the cable is not impaired.

A further object of my invention is loosely to apply a metal casing of the character generally indicated above about the insulating envelope of the conductor of the cable so as to leave a space or reservoir, extending lengthwise of the cable, between the insulating envelope and the casing, and in which a body of insulating fluid such as oil is maintained continuously under sufficient pressure to increase the dielectric strength of the oil and promote maintenance of the impregnated insulation of the cable conductor free of voids and gas pockets.

My improved cable casing is very flexible; may be made of corrosion resisting metal, if desired; is capable of withstanding high external as well as internal pressures without damage and eliminates the necessity of an armor such as is frequently employed about the exterior of lead sheathed cables. My improved cable can be laid directly in the ground without ducts.

A further advantage accruing to my invention is the fact that the metal casing or envelope I employ is light in weight as compared with lead of the same wall thickness.

Figure 2:
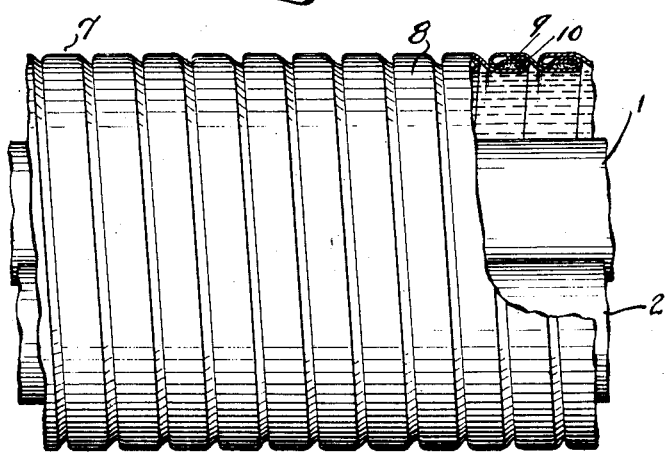

Referring to the drawing in detail:

Fig. 1 is a cross section of a cable constructed in accordance with my invention; and Fig. 2 is a part sectional elevational view of a section of my improved cable.

Referring to the drawing in detail, the cable conductors are of the stranded type and designated 1, 2 and 3. Each conductor is provided with an insulating envelope 4 of oil impregnated paper, for example, and the three insulated conductors disposed as shown in Fig. 1, for instance, within my improved metal casing 7.

The casing or impervious metal enclosure or conduit 7 in the form illustrated is composed of a metal tape 8, steel for instance or other flexible, more or less elastic metal, as distinguished from lead and such materials, wound spirally with the edges thereof interlocked as shown at 9, and if necessary packing 10 of a high grade asbestos cord, for example, may be employed to insure a liquid tight joint. The interlocked form of construction makes an extremely strong flexible enclosure for the cable and inasmuch as the joints are packed the entire structure is liquid tight so that the oil in the cable can not be forced out through the enclosure or casing when the cable is in operation.

It will be appreciated that my improved cable is particularly well adapted for use in connection with cables in which oil or other insulating fluid is maintained under high pressure within a casing surrounding the insulated conductor, and that the casing will successfully withstand pressures built up in the cable due to temperature changes from cable operation without distortion. The cable, furthermore, as a whole is more flexible than a lead sheathed cable.

While I have shown my improved cable as provided with a casing or enclosure made up of interlocked spirally wound tape, it is within the intent and purpose of my invention to employ flexible elastic metallic seamless tubing if desired.

What I claim is:—

1. A multi-conductor electric cable comprising separate impregnated paper insulated conductors submerged in a relatively large volume of oil under sufficiently high pressure to materially increase the dielectric strength of the oil, enclosed in a conduit comprising an elastic hard metal tape spirally wound and having its adjacent edges interlocked to provide a liquid-tight flexible conduit of hard elastic metal.

2. An electric cable comprising an impregnated paper insulated conductor submerged in a relatively large volume of oil under sufficiently high pressure materially to increase the dielectric strength of the oil, enclosed in a conduit comprising an elastic hard metal tape spirally wound and having its adjacent edges interlocked to provide a liquid-tight flexible conduit of hard elastic metal.

3. A multi-conductor electric cable comprising separate impregnated paper insulated conductors submerged in a relatively large volume of oil maintained under sufficiently high pressure to increase its dielectric strength and enclosed in a liquid-tight flexible hard elastic metal conduit having an undulating contour.

4. An electric cable comprising an impregnated paper insulated conductor submerged in a relatively large volume of oil maintained under sufficiently high pressure to increase its dielectric strength and enclosed in a liquid-tight flexible conduit of hard elastic metal having an undulating contour.

GUY N. EVEREST.